United States Patent [19]

Schmale et al.

[11] Patent Number: 4,938,527
[45] Date of Patent: Jul. 3, 1990

[54] PLASTIC BODY FOR VEHICLE SEATS

[75] Inventors: Gerhard Schmale, Huckeswagen; Siegfried Peters, Remscheid, both of Fed. Rep. of Germany

[73] Assignee: Keiper Recaro GmbH & Co., Fed. Rep. of Germany

[21] Appl. No.: 319,690

[22] Filed: Mar. 7, 1989

[30] Foreign Application Priority Data

Mar. 12, 1988 [DE] Fed. Rep. of Germany ....... 3808316

[51] Int. Cl.5 .............................................. A47C 7/02
[52] U.S. Cl. ..................... 297/216; 428/462; 428/521
[58] Field of Search ................. 297/216, 471, 472; 428/462, 521

[56] References Cited

U.S. PATENT DOCUMENTS

| | | | |
|---|---|---|---|
| 3,420,572 | 1/1969 | Bisland | 297/216 |
| 3,562,089 | 2/1971 | Warnaka et al. | 428/462 X |
| 3,578,376 | 5/1971 | Hasegawa | 297/216 |
| 3,627,379 | 12/1971 | Faust | 297/216 |
| 3,802,737 | 4/1974 | Mertens | 297/216 |
| 4,119,344 | 10/1978 | Kondo | 297/471 |
| 4,128,217 | 12/1978 | Mazelsky | 297/216 |
| 4,192,545 | 3/1980 | Higuchi et al. | 297/216 |
| 4,505,971 | 3/1985 | Martin et al. | 428/462 X |
| 4,505,984 | 3/1985 | Stelzer et al. | 428/462 X |
| 4,824,705 | 4/1989 | Persson et al. | 428/521 X |

Primary Examiner—Peter A. Aschenbrenner
Attorney, Agent, or Firm—Wigman & Cohen

[57] ABSTRACT

A plastic body for use in vehicle seats, having at least one element joined therewith to form a single structural unit, which element is made from a material having different physical characteristics than those of the plastic. The element is formed as a dampening element made from a plastically deformable metal securely connected with the plastic body and/or as an insert in the plastic body. Between the dampening element and/or insert and the plastic body an intermediate layer is provided, the intermediate layer being made from a material that permits relative movements between the plastic body and the dampening element and/or insert.

36 Claims, 4 Drawing Sheets

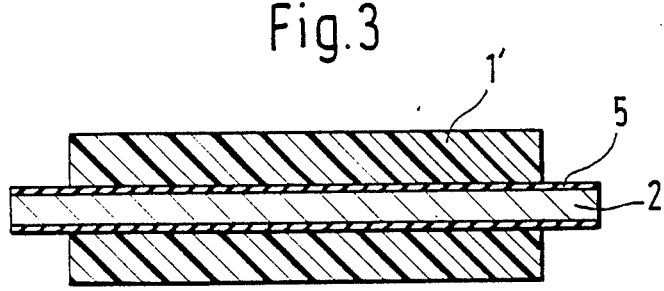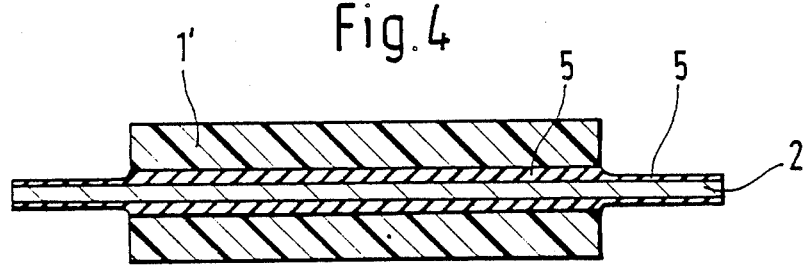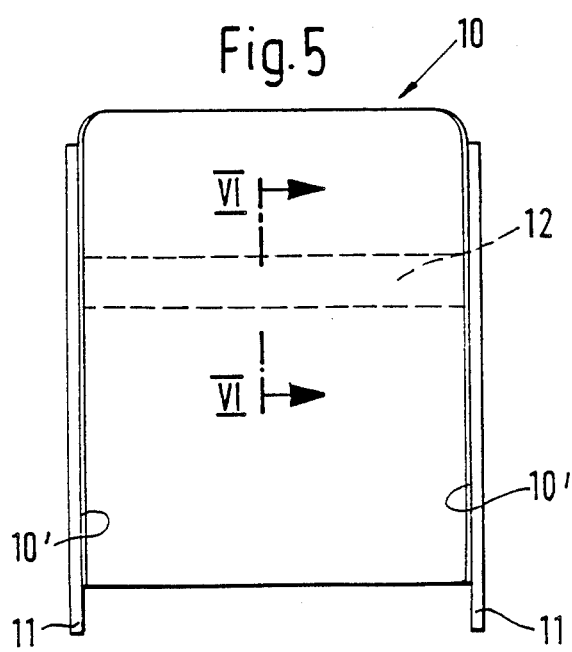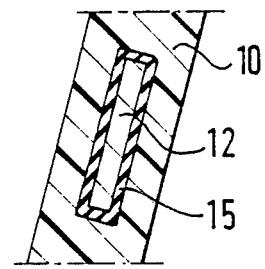

PLASTIC BODY FOR VEHICLE SEATS

BACKGROUND OF THE INVENTION

The invention relates to a plastic body, particularly for vehicle seats, having at least one element joined therewith to form a single structural unit, which element is made from a material having different physical characteristics than those of the plastic.

In the known plastic bodies of this type, in which the insert is preferably cast or extrusion coated, tears can form in the mechanically weaker material in the contact area, i.e., in those locations where the plastic and the insert contact each other. The weaker material is generally the plastic, and these tears can lead to a failure of the bond. Generally, mechanical and thermal influences are the causes for such failures.

SUMMARY AND OBJECTS OF THE INVENTION

The object of the invention is to improve the characteristics and possibilities for utilization of a plastic body of the type described above. This object is achieved with a plastic body having the characteristics of claim 1.

The intermediate layer, which forms a secure connection on one side with the plastic and on the other side with the insert, allows relative movements between the plastic and the insert, such as occur during deformations, without overloading the plastic or the material of the insert. By this means, even under severe deformations, tears in the plastic or in the insert are avoided and thus the indirect connection between both structural elements can be fully maintained. Of course, the force or load transfer between the plastic body and the insert makes it necessary to select structural shapes and structural contours that are capable of meeting the demands that will be encountered. But this does not cause any problems, because these demands, from a design point of view, are easily fulfilled.

Preferably the intermediate layer is formed by coating the insert at least in the embedded area.

To assure that the intermediate layer can fulfill its function, it is made from a material having a better deformability than the plastic and the insert. By this means it is assured in a simple manner that the intermediate layer permits the relative movements between the plastic and the insert that are necessary in order to prevent tears from forming in these elements. Of secondary importance is the fact of whether the material of the intermediate layer makes this relative movement between the plastic body and the insert possible by means of an elastic, a plastic or both an elastic and a plastic deformation.

Advantageous materials for the intermediate layers include elastomers, silicone rubbers, heat resistant rubbers and heat resistant rubber-like substances.

The plastic body can be, for example, a part of a vehicle seat with which another part of the seat, for example the seat frame or a head rest, can be connected. In the known back rests for vehicle seats, particularly motor vehicle seats whose upholstery support is formed as a shell-like flat support made from plastic, at least in the central area lying between the two lateral edge areas, in case of an accident it can occur, independently of whether side beams of metal are present or not, that the user of the seat can be accelerated forward at great speed after having been pressed against the flat support with great force, which can result in serious injury. A dampening element joined with the plastic flat support into a single structural unit, particularly a dampening element that is embedded in the flat support, such as a metal profiled bar, can strongly suppress the movements of the shell, particularly the return elasticity, whereby it is prevented that the user of te seat is accelerated forward by the back rest. In this regard one need not fear a failure of the connection between the shell and the dampening element, to the extent that the intermediate layer according to the invention is present between the two elements. However, to the extent that it is necessary to account for a deformation of the flat support that is not so severe that the connection fails, or if the back rest is exchanged for safety reasons after an accident, the intermediate layer can be omitted.

The dampening element embedded in the plastic does not have the object of avoiding the elastic deformation of the shell under an appropriate load from the seat user. In contrast, it is advantageous in that it permits a greater allowable deformation. Rather, the dampening element is intended to assume a large portion of the energy stored in the shell-like flat support during an elastic deformation thereof, and convert it into deformation work and heat, in order to assure by this means that the elastic deformation of the flat support is returned only relatively slowly. With this type of slow return deformation the danger does not exist that the seat user will be thrown from the back rest.

A dampening element can be arranged in any location where an elastic deformation of the flat support takes place. It is advantageous, however, to include the dampening element in the laminated plastic above and/or below the area supporting the lower back.

Bar-like dampening elements are especially cost-effective. With a view toward the most favorable possible ratio between weight and deformation work it is often effective to select a profile bar. A bar of this type can have, for example, a circular cross-section, a semi-circular cross-section, a C-shaped cross-section or an angled cross-section. In selecting the dimensions, one need only be sure that a plastic deformation of the shell does not occur until a load is placed thereon that is greater than the normal operational load. Plane-forming dampening elements, which can be made from expanded metal, are also suitable.

If the flat support includes lateral raised edge areas, the dampening element can extend into this edge area in order to reinforce it.

The invention is described in greater detail below with the aid of exemplary embodiments illustrated in the drawings.

BRIEF DESCRIPTION OF THE DRAWINGS

FIG. 3 is a schematically illustrated portion from FIG. 2 with an insert in the unloaded condition, FIG. 4 is a portion according to FIG. 3 with an insert in the loaded condition, FIG. 5 is a front view of a shell of a vehicle seat serving as the upholstery support of the back rest, FIG. 6 is an enlarged cross-section illustrated according to the line VI—VI in FIG. 5.

DETAILED DESCRIPTION OF THE PREFERRED EMBODIMENTS

Figure 1:
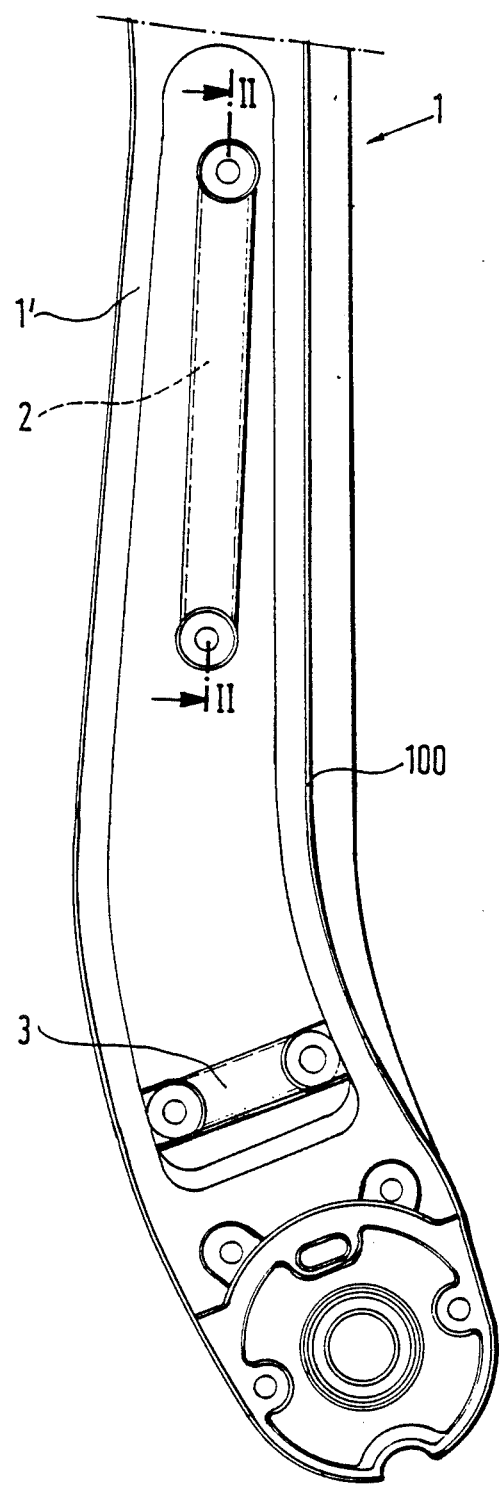
FIG. 1 is a side view of a back rest of a vehicle seat having a shell serving as the upholstery support.
Figure 2:
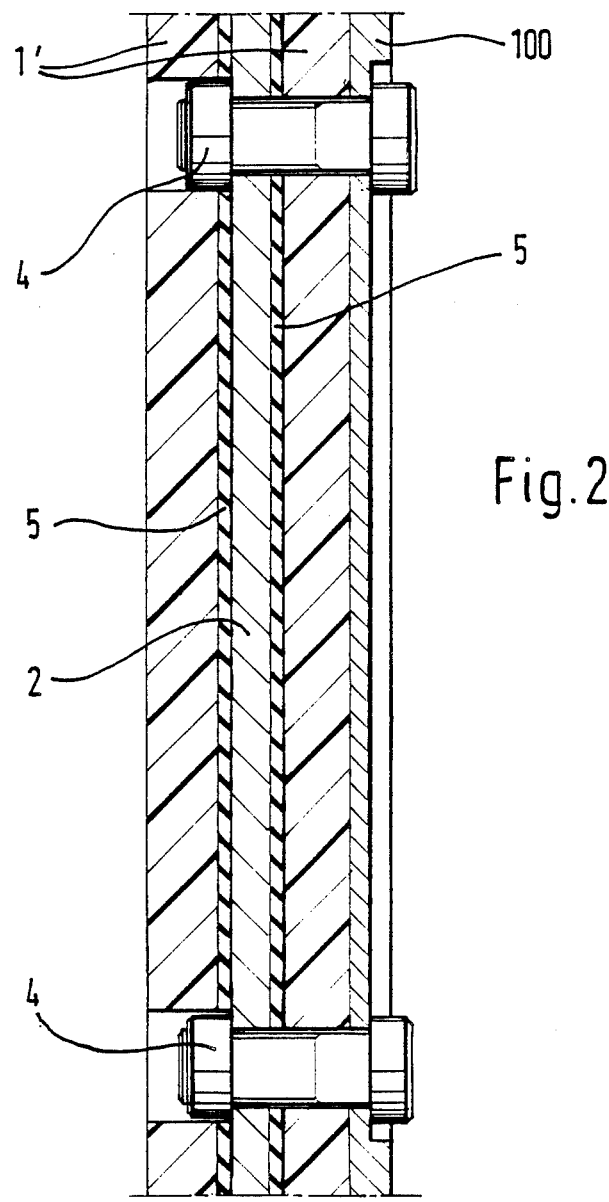
FIG. 2 is an enlarged cross-section according to the line II—II in FIG. 1.

The back rest of a motor vehicle seat has a shell 1 as an upholstery support, which may be made from, for example, a fiberglass reinforced, carbon-fiber reinforced, or similar plastic material. In the areas of its two forwardly projecting lateral edge zones 1', the shell 1 can be securely connected with respective metal side beams 100. The lower end of each of these two side beams 100 is connected in a known manner by an articulated fitting with the seat portion of the vehicle seat.

Two steel inserts 2 and 3 formed as flat bars, whose end sections each carry an inwardly directed welded nut 4, are embedded in the two lateral edge zones 1' for the connection of the shell 1 with the side beams 100. These welded nuts project of the material forming the shell 1 and receive the connection screws, by which means the side beams are connected with the shell 1.

The inserts 2 and 3 are each located in a covering 5 which forms an elastic-plastic intermediate layer. This covering 5 is made from silicon in the exemplary embodiment, and was applied to the inserts 2 and 3 before they were embedded in the lateral edge zones 1'. The covering 5 forms a secure connection both with the insert and with the lateral edge zone 1'.

If the insert 2 experiences a deformation, for example a stretching in its longitudinal direction under a mechanical load, then its cross-section is reduced, as shown in exaggerated fashion in FIG. 4. If the covering 5 were not present then tears would form in the contact area between the insert and the lateral edge zone, whereby the connection would be compromised or completely fail. The covering 5, in contrast, permits this relative movement between the insert 2 and the lateral edge zone 1', without tears forming in the material of the lateral edge zone 1. In addition, the connection between the covering 5 and the lateral edge zone on one hand and between the covering 5 and the insert 2 on the other hand, is maintained in its entirety. This is possible due to the fact that the covering elastically and/or plastically deforms to the degree required.

The shell 10 illustrated in FIG. 5, which also serves as an upholstery support of the back rest of a motor vehicle seat (not shown), is made, like the shell 1, from a fiberglass reinforced, carbon-fiber reinforced or similar plastic material.

The forwardly projecting lateral edge zones 10' of the shell 10 are securely connected with respective metal side beams 11.

Under a load on the central portion of the shell 10 from the front, as can occur when caused by a seat user, for example, during an accident, the shell 10 experiences an elastic deformation such that the central area is displaced to the rear and, accordingly, the curvature of the shell in the lateral direction is increased, whereby the spacing of the side beams 11 from each other is also reduced. In the known vehicle seat having elastic shells as back rest upholstery supports, the energy stored in the shell due to this deformation thereof can be so great that the seat user experiences an impermissibly large acceleration in an extremely short time period resulting from the return of the shell into its original position.

In the shell 10, this is prevented by a dampening element 12, which, in the exemplary embodiment, is embedded in the shell 10 in the shoulder area. The dampening element 12 extends in the lateral direction of the back rest. Its shape, size and arrangement, however, do not need to be selected as shown in FIG. 5, because the only thing that really matters is that the dampening element, or, in case a plurality of dampening elements are provided, the dampening elements, are deformed with the deformation of the shell 10 and thereby irreversibly converts energy into deformation work of the relevant seat components.

In the exemplary embodiment the dampening element 12 is formed by a flat bar consisting of a piece of steel extending in the lateral direction of the back rest from one side zone to the other. The dampening element 12 therefore experiences a plastic deformation in the form of a bending, and does so when the shell 10 is deformed under the load from the seat user, and also when the shell 10 would tend to return back into its original position. The dampening element 12 therefore reduces the bending of the shell 10 and above all prevents it from springing back toward the original position or at least slows such movement down significantly.

Of course, a flat bar is not the only shape that can be considered as a dampening element 12. Profile bars and plane-forming elements, such as those formed in the manner of an expanded metal mat, are also suitable.

To prevent tears from forming in the shell 10 due to the relative movement between the shell 10 and the dampening element 12, the dampening element 12 is provided with a covering 15 forming an intermediate layer, which in the exemplary embodiment consists of an elastic-ductile plastic or caoutshouc that forms a secure connection both with the dampening element 12 and with the shell 10, and has an adequate deformability for the relative movements that take place.

Figure 7:
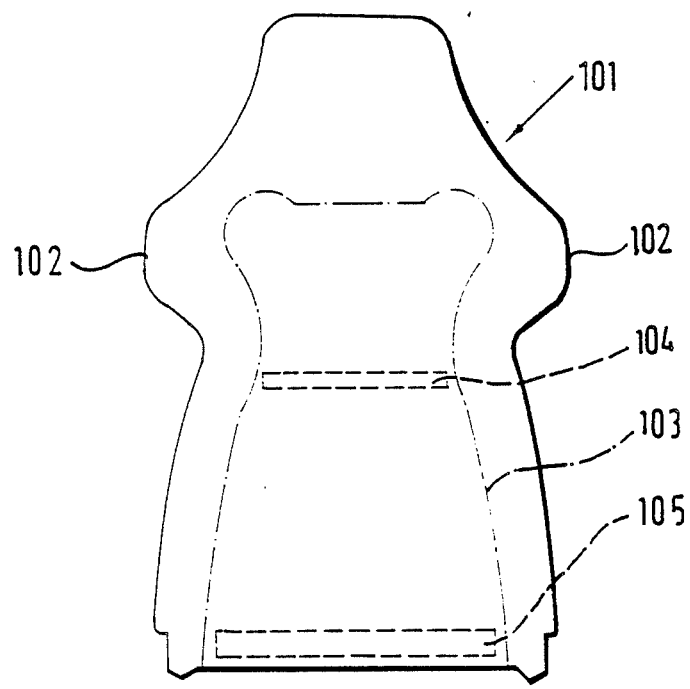
FIG. 7 is a front view of an upholstery seat of a back rest.
Figure 8:
FIGS. 8-11 are each cross-sections of respective bar-like dampening elements.
Figure 9:
Figure 10:
Figure 11:

In the example illustrated in FIG. 7 the back rest of a motor vehicle seat has a shell 101 made from plastic as an upholstery support, which is provided with side pieces 102 which expand the width and are drawn forward in the area supporting the shoulders of the seat user. The lateral edges of the shell 101 beneath these side pieces 102 project forward. These lateral edges are connected with metallic side beams (not shown), which are pivotably connected with the seat frame by means of respective articulated fittings (also not shown).

A boundary line designated with reference numeral 103 encloses the area of the shell 101 in which at least one dampening element is provided, because in this area the shell can be elastically deformed so severely by the seat user during an accident, that at the conclusion of this deformation the seat user could be thrown forward by the back rest unless measures are taken to dampen the return deformation. However, the arrangement of at least one dampening element in the area supporting the shoulders of the seat user and/or in the area beneath the area serving to support the lower back is particularly advantageous. The latter area lies between the level of the upper edge of the pelvis and the point of the hip.

Both in the lower edge zone of the area supporting the shoulders of the seat user and in the area between the level of the upper edge of the pelvis and the level of the point of the hip, these areas of the shell 101 in the exemplary embodiment are respectively laminated together with dampening rails 104, 105 comprised of a soft steel, which, as shown in FIG. 7, extend horizontally over the entire width of the shell area lying between the forwardly projecting edges. The two dampening rails 104 and 105 have a thickness of about 6 mm and a width measured from top to bottom of 20 to 30 mm.

Under normal operational loads the two dampening rails 104 and 105 do not experience any plastic deformation. In an accident, however, the elastic deformation of the shell 101 can become so large that the dampening rails 104 and 105 experience a plastic deformation. Consequently, a return deformation of the shell toward its original position has the result that the dampening rails 104 and 105 are again plastically deformed. This fact suppresses the return deformation of the shell 101 sufficiently that the result can no longer cause a dangerous forward acceleration of the seat user, since the dampening rails 104 and 105 also significantly reduce the path of the return deformation.

As shown in FIGS. 8 through 11, profile bars 106, 107, 108 and 109 can also be used in place of the dampening rails 104 and 105, which profile bars have a semicircular cross-section, a bracket-shaped cross-section, a circular cross-section and an angular cross-section.

Particularly with band or flat-shaped dampening elements, it is possible to extend these elements into the raised edges of the shell, thereby reinforcing these shell edges.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A plastic body for use in vehicle seats, having at least one element joined therewith to form a single structural unit, which element is made from a material having different physical characteristics than those of the plastic, characterized in that the element is made from a plastically deformable metal securely connected with the plastic body as an insert in the plastic body, wherein between said plastic body an intermediate layer is provided, said intermediate layer being made from a material that permits relative movements between the plastic body and the insert.

2. The plastic body according to claim 1, wherein the intermediate layer is formed by a covering of the insert at least in its embedded area.

3. The plastic body according to claim 1, wherein the intermediate layer consists of a material that has a better deformability than the plastic and the insert.

4. The plastic body according to claim 3, wherein the material of the intermediate layer has one of a greater elasticity and greater plastic deformability than the plastic and the insert.

5. The plastic body according to claim 1, wherein the intermediate layer consists of a material selected from the group of elastomers, silicone rubbers, heat resistant rubbers, and heat resistant and rubber-like substances.

6. The plastic body according to claim 1, wherein the insert is a connecting element or a portion of a connecting device.

7. The plastic body according to claim 1, wherein it is formed as a back rest upholstery support, preferably as a shell-like back rest upholstery support, of a vehicle seat and the insert is formed as a plastically deforming dampening element.

8. The plastic body according to claim 7, wherein the dampening element is embedded in the support and is preferably laminated therein.

9. The plastic body according to claim 7, wherein the dampening element is arranged at a location which is one of above and beneath the area supporting the lower back.

10. The plastic body according to claim 2, wherein the intermediate layer consists of a material that has a better deformability than the plastic and the insert.

11. The plastic body according to claim 2, wherein the intermediate layer consists of a material selected from the group of elastomers, silicone rubbers, heat resistant rubbers, and heat resistant and rubber-like substances.

12. The plastic body according to claim 3, wherein the intermediate layer consists of a material selected from the group of elastomers, silicone rubbers, heat resistant rubbers, and heat resistant and rubber-like substances.

13. The plastic body according to claim 4, wherein the intermediate layer consists of a material selected from the group of elastomers, silicone rubbers, heat resistant rubbers, and heat resistant and rubber-like substances.

14. The plastic body according to claim 2, wherein the insert is a connecting element or a portion of a connecting device.

15. The plastic body according to claim 5, wherein the insert is a connecting element or a portion of a connecting device.

16. The plastic body according to claim 5, wherein it is formed as a back rest upholstery support, preferably as a shell-like back rest upholstery support, of a vehicle seat and the insert is formed as a plastically deforming dampening element.

17. The plastic body according to claim 15, wherein it is formed as a back rest upholstery support, preferably as a shell-like back rest upholstery support, of a vehicle seat and the insert is formed as a plastically deforming dampening element.

18. The plastic body according to claim 8, wherein the dampening element is arranged at a location which is one of above and beneath the area supporting the lower back.

19. The plastic body according to claim 3, wherein the insert is a connecting element or a portion of a connecting device.

20. The plastic body according to claim 4, wherein the dampening element is arranged at a location which is one of above and beneath the area supporting the lower back.

21. A plastic body for use in vehicle seats, having at least one element joined therewith to form a single structural unit, which element is made from a material having different physical characteristics than those of the plastic, characterized in that the element is formed as a dampening element made from a plastically deformable metal securely connected with the plastic body, wherein between said dampening element and said plastic body an intermediate layer is provided, said intermediate layer being made from a material that permits relative movements between the plastic body and the dampening element.

22. The plastic body of claim 21 wherein said dampening element is also formed as an insert in said plastic body.

23. The plastic body according to claim 21, wherein the intermediate layer is formed by a covering of the dampening element at least in its embedded area.

24. The plastic body according to claim 21, wherein the intermediate layer consists of a material that has a better deformability than the plastic and the dampening element.

25. The plastic body according to claim 24, wherein the material of the intermediate layer has one of a greater elasticity and greater plastic deformability than the plastic and the dampening element.

26. The plastic body according to claim 21, wherein the intermediate layer consists of a material selected from the group of elastomers, silicone rubbers, heat resistant rubbers, and heat resistant and rubber-like substances.

27. The plastic body according to claim 21, wherein the dampening element is a connecting element or a portion of a connecting device.

28. The plastic body according to claim 22, wherein it is formed as a back rest upholstery support, preferably as a shell-like back rest upholstery support, of a vehicle seat and the insert is formed as a plastically deforming dampening element.

29. The plastic body according to claim 28, wherein the dampening element is embedded in the support and is preferably laminated therein.

30. The plastic body according to claim 28, wherein the dampening element is arranged at a location which is one of above and beneath the area supporting the lower back.

31. The plastic body according to claim 23, wherein the intermediate layer consists of a material that has a better deformability than the plastic and the dampening element.

32. The plastic body according to claim 23, wherein the intermediate layer consists of a material selected from the group of elastomers, silicone rubbers, heat resistant rubbers, and heat resistant and rubber-like substances.

33. The plastic body according to claim 24, wherein the intermediate layer consists of a material selected from the group of elastomers, silicone rubbers, heat resistant rubbers, and heat resistant and rubber-like substances.

34. The plastic body according to claim 25, wherein the intermediate layer consists of a material selected from the group of elastomers, silicone rubbers, heat resistant rubbers, and heat resistant and rubber-like substances.

35. The plastic body according to claim 23, wherein the dampening element is a connecting element or a portion of a connecting device.

36. The plastic body according to claim 26, wherein the dampening device is a connecting element or a portion of a connecting device.

* * * * *